US011459043B2

(12) United States Patent
Höβle et al.

(10) Patent No.: US 11,459,043 B2
(45) Date of Patent: Oct. 4, 2022

(54) VEHICLE COMBINATION AND METHOD FOR CONTROLLING A DRIVE

(71) Applicant: SAF-HOLLAND GmbH, Bessenbach (DE)

(72) Inventors: Florian Höβle, Bessenbach (DE); Rainer Stegmann, Hösbach (DE); Stefan Wallmeier, Goldbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 276 days.

(21) Appl. No.: 16/330,280

(22) PCT Filed: Sep. 1, 2017

(86) PCT No.: PCT/EP2017/071993
§ 371 (c)(1),
(2) Date: Mar. 4, 2019

(87) PCT Pub. No.: WO2018/050460
PCT Pub. Date: Mar. 22, 2018

(65) Prior Publication Data
US 2019/0202511 A1    Jul. 4, 2019

(30) Foreign Application Priority Data
Sep. 13, 2016   (DE) .................... 10 2016 117 165.4

(51) Int. Cl.
*B62D 59/04*          (2006.01)
*B60W 40/114*      (2012.01)
(Continued)

(52) U.S. Cl.
CPC ........... *B62D 59/04* (2013.01); *B60W 40/105* (2013.01); *B60W 40/114* (2013.01);
(Continued)

(58) Field of Classification Search
CPC ... B62D 59/04; B60W 40/114; B60W 40/105; B60W 30/18009; B60W 2510/09; B60W 2300/126
See application file for complete search history.

(56) References Cited

U.S. PATENT DOCUMENTS 2,347,898  A  *  5/1944  Henry ................ B62D 53/0821
                                                     280/406.1
4,140,194  A  *  2/1979  Moreau .................. B60K 17/10
                                                     180/14.3
(Continued)

FOREIGN PATENT DOCUMENTS

DE            3535225         4/1986
DE           10131935         3/2002
(Continued)

OTHER PUBLICATIONS

FR-2611611-A1 translation (Year: 1998).*
(Continued)

*Primary Examiner* — Jeff A Burke
*Assistant Examiner* — Kyle T Johnson
(74) *Attorney, Agent, or Firm* — Price Heneveld LLP

(57) ABSTRACT

The invention relates to a vehicle combination having a towing vehicle and a trailer, wherein the trailer has a drive which is coupled to a wheel of the trailer, wherein a control unit is provided and is designed to receive a signal of a sensor, wherein the control unit controls the operation of the drive as a function of the signal. Furthermore, the present invention relates to a method for controlling a drive in a vehicle combination.

18 Claims, 1 Drawing Sheet

(51) Int. Cl.
  *B60W 40/105* (2012.01)
  *B60W 30/18* (2012.01)
(52) U.S. Cl.
  CPC . *B60W 30/18009* (2013.01); *B60W 2300/126* (2013.01); *B60W 2510/09* (2013.01)

(56) References Cited

U.S. PATENT DOCUMENTS

| | | | | |
|---|---|---|---|---|
| 7,089,101 | B2* | 8/2006 | Fischer | B60W 10/18 701/41 |
| 8,930,114 | B1* | 1/2015 | Reid | B60T 7/20 701/83 |
| 9,274,522 | B2* | 3/2016 | Boos | B62D 1/00 |
| 9,623,859 | B2* | 4/2017 | Lavoie | B60W 10/20 |
| 2002/0095980 | A1* | 7/2002 | Breed | B60N 2/0276 73/146 |
| 2006/0212193 | A1* | 9/2006 | Breed | B60C 23/0425 701/33.7 |
| 2007/0194557 | A1* | 8/2007 | Caporali | B60D 1/242 280/493 |
| 2011/0210529 | A1* | 9/2011 | Markstaller | B62D 53/0814 280/438.1 |
| 2013/0076497 | A1* | 3/2013 | Sheidler | B62D 59/04 340/431 |
| 2014/0095048 | A1* | 4/2014 | Peterson | B60W 30/18009 701/101 |
| 2016/0023526 | A1* | 1/2016 | Lavoie | B62D 15/0285 701/41 |
| 2016/0264046 | A1* | 9/2016 | Bochenek | B60D 1/30 |
| 2016/0318493 | A1* | 11/2016 | Drako | B60T 8/1708 |
| 2017/0106865 | A1* | 4/2017 | Lavoie | B62D 13/06 |
| 2019/0009815 | A1* | 1/2019 | Lavoie | B60W 40/114 |
| 2019/0202511 | A1* | 7/2019 | Ho | B60W 40/114 |

FOREIGN PATENT DOCUMENTS

| | | | |
|---|---|---|---|
| DE | 10244298 | 4/2004 | |
| DE | 102006052274 | 5/2008 | |
| EP | 1818245 A1 * | 8/2007 | B60T 7/20 |
| EP | 2651678 B1 * | 8/2015 | B62D 53/06 |
| FR | 2611611 A1 * | 9/1988 | B62D 59/04 |
| FR | WO-2018078039 A1 * | 5/2018 | B60K 17/354 |
| GB | 2466086 | 6/2010 | |
| GB | 2486474 | 6/2012 | |
| KR | 20160070798 A * | 12/2013 | |
| WO | 2011108948 | 9/2011 | |

OTHER PUBLICATIONS

EP-1818245-A1 translation (Year: 2007).*
WO-2018078039-A1 translation (Year: 2018).*
KR-20160070798-A Translation (Year: 2013).*
European Patent Office; International Search Report; dated Dec. 12, 2017.

* cited by examiner

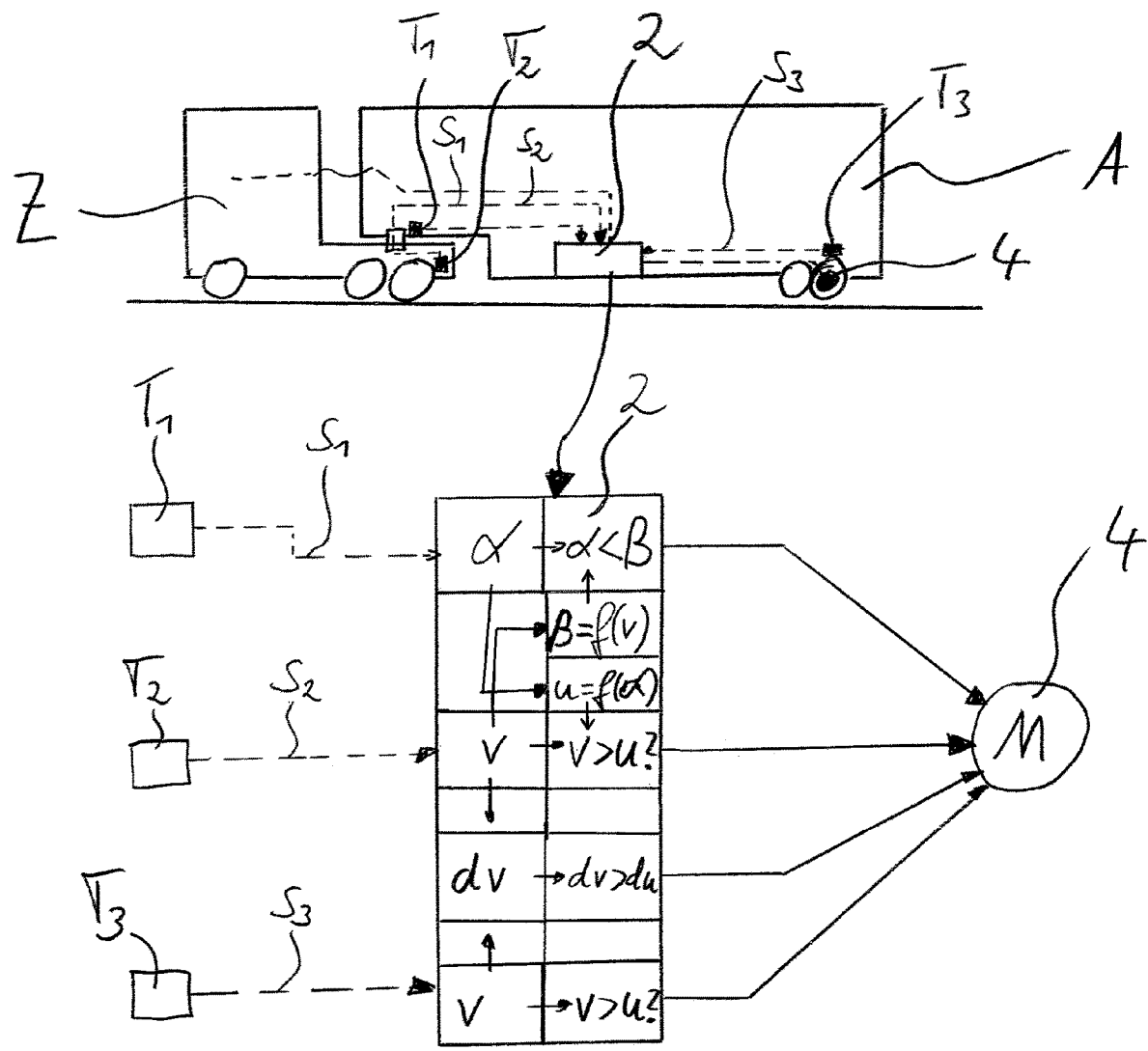

VEHICLE COMBINATION AND METHOD FOR CONTROLLING A DRIVE

BACKGROUND OF THE INVENTION

The present invention relates to a vehicle combination and to a method for controlling a drive.

It is already known from the prior art to couple, to a trailer which is hitched to a towing vehicle, a drive, in particular an additional drive, which when necessary can transmit a relatively high driving force to the trailer and therefore permits the vehicle combination composed of a towing vehicle and trailer to move forward, for example in difficult terrain. In particular, in this context hydraulically operated drives are already known from the prior art, wherein electric motors which are coupled to individual wheels are also used. However, in the open-loop controllers or closed-loop control devices which have been known hitherto for actuating and operating such drives have until now been of very simple design, and a high degree of expenditure on the control in order to bring about the correct setting and the appropriate operating mode at the drive in various operating states of the vehicle combination has always been required of the user or of the driver of the vehicle of a vehicle combination with such a drive.

The object of the present invention is therefore to make available an improved vehicle combination with a drive on the trailer and an improved method for controlling the drive.

SUMMARY OF THE INVENTION

According to the invention, the vehicle combination has a towing vehicle and a trailer, wherein the trailer has a drive which is coupled or operatively connected to a wheel of the trailer, wherein a control unit is provided and is designed to receive a signal of a sensor, wherein the control unit controls the operation of the drive as a function of the signal. The vehicle combination is preferably a utility vehicle composed of a towing vehicle and a trailer, such as, for example, a semitrailer. A two-axle dump truck, to which a trailer which also has two axles and has an articulated tow bar is hitched, is also conceivable. The control unit here is preferably a microcontroller circuit which is equipped with signal inputs and corresponding signal outputs. The control unit preferably has an internal memory in which value tables can be stored in order to calculate a corresponding switching logic from incoming signals and correspondingly be able to output outgoing signals to actuate the drive or a multiplicity of drives. The control unit advantageously controls a valve arrangement which in turn controls the inflow of hydraulic fluid to a drive which is embodied as a hydrostatic additional motor. In addition to the signal which is sent from a sensor to the control unit, the control unit also receives the control signal from a user, in particular from the driver of the vehicle combination. The signal which is sent by the user is here preferably an on signal or off signal or a signal which requires a specific operating state, such as, in particular, a specific torque, from the additional drive, and is correspondingly interpreted by the control unit and converted into a control signal to the additional drive. In addition to the signal which is sent by the user to the control unit, the control unit also receives the signal from at least one sensor which is provided on the towing vehicle or on the trailer, and monitors the movement state or the operating state of a specific characteristic variable of the vehicle combination. In this context, the control unit advantageously superimposes the signal sent to the control unit by the user by means of a switching logic triggered by the signal received by the sensor. In other words, for example even if the user requests activation of the drive, but the speed of the vehicle combination is too high for the use of the drive, the control unit will not activate the drive, wherein, in particular, safety can be improved and the service life of the drive can as a result be extended.

A first sensor is advantageously provided which measures or senses the angular orientation between the towing vehicle and the trailer and transmits it as a first signal to the control unit, wherein the control unit determines an actual angle from the first signal and compares said actual angle with a limiting angle, wherein the control unit activates the drive only if the actual angle is smaller than the limiting angle. In particular in order to avoid, in the case of a highly deflected position between the towing vehicle and the trailer, the additional drive transmitting a torque to the wheel of the trailer which would cause a force component acting transversely with respect to the longitudinal direction of the towing vehicle to act on the towing vehicle and in the process, on the one hand, could cause the towing vehicle to tip over and, on the other hand, could bring about increased tire wear on the towing vehicle, a first sensor monitors the angular orientation between the towing vehicle and the trailer and transmits a corresponding first signal to the control unit.

The actual angle which is calculated from the signal by the control unit is preferably here an angle which expresses the deviation of the orientation of the two longitudinal axes of the utility vehicle and towing vehicle from an angle of 180°. In other words, if the longitudinal axes of the towing vehicle and of the trailer are collinear or parallel to one another, the actual angle is 0°. The actual angle is therefore defined as the angular deviation of the longitudinal axes of the towing vehicle and of the trailer from a parallel orientation with respect to one another. Moreover, the actual angle is preferably measured only in the horizontal plane. In other words, the actual angle is therefore the angle between the longitudinal axes of the towing vehicle and of the trailer in a plan view onto the vehicle combination, wherein the respectively smallest angle which can be measured between the two longitudinal axes is defined as the actual angle. Preferably a limiting value which is calculated by the control unit from other state values measured at the vehicle combination, or which is stored in a memory of the control unit, is referred to as the limiting angle. In this way, the safety during the operation of a vehicle combination with a trailer and/or an additional motor on the trailer can be advantageously greatly increased.

The limiting angle value is advantageously between 10° and 45° and preferably between 15° and 35°. In this context, physical factors of both the design of the utility vehicle, the cargo and the current movement speed of the utility vehicle are decisive for the selection of the correct limiting angle. It has become apparent that an angular range between 10° and 45° both in the stationary state and in the case of a moving vehicle combination constitutes a good compromise for the majority of the currently known utility vehicle systems in respect of the, on the one hand, versatile usability of an additional drive on the trailer and also a sufficiently high level of safety against excessively large transverse components which could be transmitted to the towing vehicle by the drive, ensures. The narrower range of 15° to 35° and particularly preferably of approximately 25° has proven particularly safe and reliable here for trailers of 40-tonne utility vehicle combinations.

A second sensor advantageously measures the rotational speed of a wheel of the towing vehicle and transmits it as a second signal to the control unit, wherein the control unit determines an actual speed from the second signal and compares said actual speed with a limiting speed, wherein the control unit activates the drive only if the actual speed is lower than the limiting speed. Similar to the procedure of the control unit when comparing an actual angle with a limiting angle, the control unit is preferably also designed to receive a second signal of a second sensor which measures the rotational speed and/or the revolutions per minute at a wheel of the towing vehicle. From this preferably digital signal the control unit calculates an actual speed on the basis of stored data relating to the geometry of the vehicle wheels of the vehicle combination. This actual speed is compared with a limiting speed which is stored in the memory of the control unit, wherein a switching logic of the control unit activates the drive only if the actual speed is lower than the predefined limiting speed. In this way it is possible to prevent the drive from being activated if the speed of the vehicle combination is too high for the operation thereof and could risk damage to the drive.

Alternatively or additionally a third sensor is advantageously provided which measures the rotational speed of that wheel of the trailer to which the drive is coupled and transmits it as a third signal to the control unit, wherein the control unit determines an actual speed from the third signal and compares said actual speed with a limiting speed, wherein the control unit activates the drive only if the actual speed is lower than the limiting speed. In an analogous fashion to the measurement of the speed of a wheel of the towing vehicle as described above, the rotational speed of the wheel of the trailer can also be measured, and an actual speed of the trailer can be calculated therefrom by the control unit. In this context, the further control sequence is the same as the previously described control sequence when measuring the rotational speed of the wheel on the towing vehicle.

The limiting speed is advantageously between 5 km/h and 40 km/h and preferably between 8 km/h and 15 km/h. It has become apparent that the additional motors which can currently be commercially used permit maximum speeds of 40 km/h and at relatively high speeds no longer have the same efficiency as the main drive of the utility vehicle. In addition, it is to be expected that at least up to a speed of 5 km/h an intervention of the drive to support the forward travel or rearward travel of the trailer, in particular in difficult terrain, is appropriate. It has therefore become apparent that in vehicles which are traveling in particularly difficult terrain, in some cases speeds above 5 km/h constitute a safety risk, with the result that a limiting speed of 5 km/h can be provided for such areas. A limiting speed which is between 8 and 15 km/h has proven appropriate here, in particular, for the use of hydrostatic additional drives, since they achieve the greatest efficiency and service life in this range.

The control unit advantageously determines a speed difference between the wheel of the towing vehicle and the wheel of the trailer from the second signal and the third signal and compares said speed difference with a limiting difference, wherein the control unit automatically activates the drive if the speed difference is greater than the limiting difference. The control unit method described here corresponds to an anti-slip control process. This principle is intended to be transferred here to the interplay of a towing vehicle and of the trailer which is hitched to the towing vehicle. If a speed difference is present between the driven wheel of the towing vehicle and the driven wheel of the trailer, this is an indication that either the wheel of the towing vehicle or the wheel of the trailer does not have any traction with the corresponding underlying surface. In this case it is preferred that the control unit automatically correspondingly switches on the drive at the trailer without the user having to send corresponding signal to the control unit. It is preferred here that only a difference in which the rotational speed of the wheel of the towing vehicle is higher than the rotational speed of the wheel of the trailer ever brings about a corresponding switching operation of the control unit. If the driven wheel of the trailer is to rotate more quickly than the driven wheel of the utility vehicle, it is preferred for the control unit to switch off the drive on the trailer.

The limiting difference is preferably between 3 revolutions per minute and 45 revolutions per minute. In this difference range, spinning of the wheels on the towing vehicle can be effectively prevented, and therefore both the propulsion of the vehicle combination can be improved and additional tire wear on the towing vehicle can be prevented.

Furthermore, the control unit preferably determines the limiting angle as a function of the actual speed, wherein the limiting angle decreases as the actual speed increases. For the preferred case in which both the actual angle and an actual speed are measured on the vehicle combination and processed by the control unit, it is preferred that the limiting angle is not static or permanently stored in the control unit but is instead calculated by the control unit as a function of the calculated actual speed of the vehicle combination. It is therefore necessary, in particular in the case of relatively high speeds of the vehicle combination, to decrease the limiting angle, since otherwise dangerous transverse force components can be generated by the excessive use of the drive on the trailer, which transverse force components could cause the vehicle combination to tip over. In this way, the safety during the operation of a vehicle combination with an additional drive on the trailer can be increased.

The second sensor and/or the third sensor, if one is present, are/is preferably embodied as an inductive sensor. Inductive sensors are suitable, in particular, for use with a pole wheel, wherein pole wheels which are corresponding already present on utility vehicles can be employed in order to be able to use a second and/or a third sensor. In this way it is possible to lower costs, since speed sensing devices which are already provided on utility vehicles can be used.

The second sensor and/or the third sensor particularly preferably generate a digital square-wave signal in this context. For this purpose, the sensor which is embodied as an inductive sensor is preferably equipped with an integrated signal filtering means and a Schmitt trigger, that is to say an analogue/digital conversion means. A digital or binary signal has the advantage that it can be readily interpreted by a relatively large number of control units. Furthermore, such a signal which is generated by the sensor at very low speeds or rotational speeds of the respective wheel with a sufficient signal strength is already present, with the result that a corresponding signal can be used and evaluated by the control unit even at low speeds of the utility vehicle.

At rotational speeds of the wheel which less than 10 revolutions per minute, preferably less than 1 revolution per minute and particularly preferably less than 0.5 revolutions per minute, the second sensor and/or the third sensor can preferably output a signal which can be interpreted by the control unit. This signal is preferably a digital signal which thus, depending on the setting of the Schmitt trigger which in turn converts an analogue signal into a digital signal, always has a corresponding amplitude and can therefore be interpreted by the control unit even at low speeds of the wheel. The sensor is therefore advantageously suitable for vehicle combinations which have an additional drive and in which the speeds to be controlled are often lower than 5 km/h.

Two drives are particularly preferably provided on the trailer and are respectively coupled to a wheel of the trailer, wherein the control unit actuates the drives equally or differently as a function of the signals which are transmitted via sensors. In a first preferred embodiment, in each case one wheel on the right-hand side of the trailer and one wheel on the left-hand side of the trailer is respectively driven by, in each case, one drive here. For this case, the control unit is designed, for example in the case of cornering of the vehicle combination which is determined by a first sensor and the corresponding angular deviation between the towing vehicle and the trailer and is transmitted to the control unit, to set a higher driving speed at the wheel which is respectively on the outside of the bend than at the wheel which is on the inside of the bend. In other words, the control unit can therefore model the method of functioning of a differential. Alternatively or additionally, the two driven wheels of the trailer are preferably arranged one behind the other in the direction of travel, wherein depending on the torque demand at the trailer just one drive or both drives are actuated by the control unit. In this context, a total of four wheels of the trailer are particularly preferably driven by drives, wherein in each case two drives are arranged one behind the other on the right-hand side of the vehicle and two drives one behind the other on the left-hand side of the vehicle.

According to the invention, a method for controlling a drive is provided, wherein the drive is arranged on a trailer and is coupled to a wheel of the trailer, which method has the steps:
a) making available a control unit and a sensor, wherein the control unit is connected to the sensor and the drive via signal lines and/or mechanically,
b) measuring an angle between a towing vehicle and the trailer and/or a rotational speed of a wheel on the towing vehicle and/or on the trailer,
c) transmitting the measured value or values in the form of a signal to the control unit,
d) determining actual values for angle or speed or speed difference by means of the control unit and comparing the actual values with limiting values, wherein the limiting values are stored in a memory of the control unit or are calculated by the control unit,
e) actuating the drive as a function of a switching logic which is stored in the control unit.

The method according to the invention improves the operation of a vehicle combination in which a towing vehicle and a trailer are provided, wherein, at the trailer, a drive, in particular an additional drive, is connected to a wheel. In this context, the safety can be significantly increased for the operation of this vehicle combination, since the method is, in particular, designed to superimpose instructions which are given by the user or driver of the vehicle combination and which put the safety of the vehicle combination at risk. Therefore, the control unit can prevent the drive on the trailer from being activated, in particular at excessively high travel speeds or at excessively high deflection angles between the towing vehicle and the trailer. At the same time, for example in the case of a loss of traction at the towing vehicle, the control unit can automatically and independently activate the drive on the trailer and therefore generate an increased driving torque for the vehicle combination.

The control unit advantageously receives a user signal and processes it, wherein the control unit activates the drive only if both the user signal and the switching logic permit activation of the drive. In other words, this drive is therefore activated by a drive on the trailer only if, on the one hand, the user requests additional drive by the drive on the trailer and, on the other hand, if also at the same time the switching logic which is provided in the control unit and which takes into account the corresponding safety parameters of the operation of the vehicle combination permits said additional drive of the vehicle combination by a drive on the trailer. The switching logic therefore constitutes a safe entity during the operation of a drive, in particular of an additional drive on the vehicle combination composed of a towing vehicle and a trailer.

Of course, the features of the vehicle combination described above which relate to a method for controlling a drive can also be used in the method according to the invention.

BRIEF DESCRIPTION OF THE DRAWINGS

Further advantages and features of the present invention can be found in the following description with reference to the appended drawing.

In this context, FIG. 1 shows a schematic view of a vehicle combination and simplified block diagram from which both the individual components of a vehicle combination and a procedure for controlling a drive on such a vehicle combination are apparent. The vehicle combination is constructed according to the invention from a towing vehicle Z and a trailer A. In this context, in this preferred embodiment, the control unit 2 is preferably arranged on the trailer A and secured thereto. The control unit 2 is connected via various signal lines to at least three sensors T which each send signals S to the control unit. Furthermore, the control unit is connected via signal lines to a valve arrangement and can open or close valves via corresponding control signals in the valve arrangement, and can therefore commence or end operation of the drive 4. A first sensor $T_1$ is preferably arranged here in the region of the king pin and of the fifth-wheel coupling of the vehicle combination and measures the angle of the longitudinal axes of the towing vehicle Z and of the trailer A. The first signal $S_1$ which is transmitted by this first sensor $T_1$ is received by the control unit and correspondingly evaluated, wherein the control unit 2 calculates an actual angle $\alpha$ from this first signal $S_1$. Furthermore, preferably a second sensor $T_2$ is arranged on the towing vehicle Z, which sensor $T_2$ measures the rotational speed of a wheel, particularly preferably of a driven wheel of the towing vehicle Z, and sends a corresponding second signal $S_2$ to the control unit 2. As an alternative to or in addition to the second sensor $T_2$ a third sensor $T_3$ is provided on the trailer A, which third sensor $T_3$ determines the rotational speed of a wheel on the trailer A in a way analogous to the second sensor $T_2$. The third sensor $T_3$ sends a corresponding third signal $S_3$ to the control unit 2. The control unit determines an actual speed v from the second signal $S_2$ and/or the third signal $S_3$. The actual angle $\alpha$ is compared here with a limiting angle $\beta$ by the control unit 2. The actual speed v is compared with a limiting speed u by the control unit 2. In accordance with the output of these comparisons, the control unit 2 sends a corresponding control signal to the drive 4 or indirectly to the drive 4 by means of the actuation of the valve arrangement. If rotational speeds of the respectively driven wheels can be determined both at the trailer A and at the towing vehicle Z, the control unit 2 can determine a speed difference dv from the corresponding second signal $S_2$ and the third signal $S_3$ and compare said speed difference dv with a limiting difference du. If a higher rotational speed of the driven wheel is present at the towing vehicle Z than at the driven wheel of the trailer A, the control unit 2 automatically activates the drive 4. In this way, when there is a loss of traction at the towing vehicle Z, the drive 4 can make available an additional torque to propel the vehicle combination and therefore permit the vehicle combination to move forward even in difficult terrain.

LIST OF REFERENCE SYMBOLS

2—Control unit
4—Drive
α—Actual angle
β—Limiting angle
A—Trailer
dv—Speed difference
du—Limiting difference
S—Signal
$S_{1,2}$ . . . —First, second, . . . signal
T—Sensor
$T_{1,2}$ . . . —First, second, . . . sensor
u—Limiting speed
v—Actual speed
Z—Towing vehicle

The invention claimed is:

1. A vehicle combination, comprising:
a towing vehicle;
a trailer including a drive coupled to a wheel of the trailer; and
a control unit configured to receive a signal of a sensor;
wherein the control unit controls an operation of the drive as a function of the signal, wherein a first sensor senses an angular orientation between the towing vehicle and the trailer and transmits it as a first signal to the control unit, wherein the control unit determines an actual angle from the first signal and compares the actual angle with a limiting angle between the towing vehicle and the trailer, wherein the control unit activates the drive only if the actual angle is smaller than the limiting angle, and wherein the limiting angle is between 10° and 45°;
wherein the control unit is configured to control a valve arrangement which is configured to control an inflow of hydraulic fluid to the drive, and wherein the drive includes a hydrostatic motor; and
wherein the control unit is configured to determine an actual speed of the towing vehicle and/or the trailer and compare the actual speed to a limiting speed, wherein the control unit activates the drive only if the actual speed is lower than the limiting speed where the limiting speed is less than or equal to 15 km/h.

2. The vehicle combination as claimed in claim 1, wherein the actual angle is the angular deviation of the longitudinal axes of the towing vehicle and of the trailer from 180° in the horizontal.

3. The vehicle combination as claimed in claim 1, wherein the limiting angle is between 15° and 35°.

4. The vehicle combination as claimed in claim 1, wherein a second sensor measures the rotational speed of a wheel of the towing vehicle and transmits the rotation speed of the wheel of the towing vehicle as a second signal to the control unit, and wherein the control unit determines the actual speed from the second signal.

5. The vehicle combination as claimed in claim 4, wherein a third sensor measures the rotational speed of the wheel of the trailer to which the drive is coupled and transmits the rotational speed of the wheel of the trailer as a third signal to the control unit, and wherein the control unit determines the actual speed from the third signal.

6. The vehicle combination as claim 5, wherein the limiting speed is between 5 km/h and 15 km/h.

7. The vehicle combination as claimed in claim 6, wherein the limiting speed is between 8 km/h and 15 km/h.

8. The vehicle combination as claimed in claim 5, wherein the control unit determines a speed difference between the wheel of the towing vehicle and the wheel of the trailer from the second signal and the third signal, and compares the speed difference with a limiting difference, wherein the control unit automatically activates the drive if the speed difference is greater than the limiting difference.

9. The vehicle combination as claimed in claim 4, wherein the control unit determines the limiting angle as a function of the actual speed, wherein the limiting angle decreases as the actual speed increases.

10. The vehicle combination as claimed in claim 4, wherein at least one of the second sensor and the third sensor is an inductive sensor.

11. The vehicle combination as claimed in claim 4, wherein the second sensor and/or the third sensor generates a digital square-wave signal.

12. The vehicle combination as claimed in claim 4, wherein at rotational speeds of the wheel of the towing vehicle or the wheel of the trailer which are lower than 10 $min^{-1}$ the second sensor and/or the third sensor output a signal which can be interpreted by the control unit.

13. The vehicle combination as claimed in claim 12, wherein at rotational speeds of the wheel of the towing vehicle or the wheel of the trailer which are lower than 1 $min^{-1}$ the second sensor and/or the third sensor output a signal which can be interpreted by the control unit.

14. The vehicle combination as claimed in claim 13, wherein at rotational speeds of the wheel of the towing vehicle or the wheel of the trailer which are lower than 0.5 $min^{-1}$ the second sensor and/or the third sensor output a signal which can be interpreted by the control unit.

15. The vehicle combination as claimed in claim 1, wherein two drives are provided on the trailer and are respectively coupled to a wheel of the trailer, wherein the control unit actuates the drives equally or differently as a function of the signals which are transmitted via sensors.

16. A method for controlling a drive arranged on a trailer and coupled to a wheel of the trailer, comprising:
providing a control unit and a sensor, wherein the control unit is connected to the sensor and the drive via signal lines and/or mechanically;
measuring an angle between a towing vehicle and the trailer and/or a rotational speed of a wheel on the towing vehicle and/or a rotational speed of a wheel on the trailer, wherein at least one first sensor senses the angular orientation between the towing vehicle and the trailer;
transmitting the measured value or values in the form of a signal to the control unit, including at least of the signal of the first sensor to the control unit;
determining actual values via the control unit and comparing the actual values with limiting values, wherein the limiting values are stored in a memory of the control unit or are calculated by the control unit, wherein at least one actual value is an actual angle which is the angular deviation of the longitudinal axis of the towing vehicle and of the trailer from 180° in the horizontal, and wherein at least one limiting value is a limiting angle; and actuating the drive as a function of a switching logic which is stored in the control unit, wherein the control unit activates the drive only if the actual angle is smaller than the limiting angle;

wherein the control unit controls a valve arrangement which controls an inflow of hydraulic fluid to the drive, and wherein the drive includes a hydrostatic motor;

wherein another actual value of the actual values is an actual speed of the trailer and/or an actual speed of the towing vehicle and wherein another limiting value of the limiting values is a limiting speed, and wherein the control unit actives the drive only if the actual speed of the trailer and/or the actual speed of the towing vehicle is less than or equal to 15 km/h.

17. The method as claimed in claim 16, wherein the control unit receives and processes a user signal, wherein the control unit activates the drive only if both the user signal and the switching logic permit activation of the drive.

18. A vehicle combination, comprising:
a towing vehicle;
a trailer including a drive coupled to a wheel of the trailer; and
a control unit configured to receive a signal of a sensor;
wherein the control unit controls an operation of the drive as a function of the signal, wherein a first sensor senses an angular orientation between the towing vehicle and the trailer and transmits it as a first signal to the control unit, wherein the control unit determines an actual angle from the first signal and compares the actual angle with a limiting angle between the towing vehicle and the trailer, wherein the control unit activates the drive only if the actual angle is smaller than the limiting angle, and wherein the limiting angle is between 10° and 45°;
wherein the control unit is configured to determine an actual speed of the trailer and/or the towing vehicle and compare the actual speed to a limiting speed, wherein the control unit activates the drive only if the actual speed is less than or equal to 15 km/h.

* * * * *

UNITED STATES PATENT AND TRADEMARK OFFICE
CERTIFICATE OF CORRECTION

| | |
|---|---|
| PATENT NO. | : 11,459,043 B2 |
| APPLICATION NO. | : 16/330280 |
| DATED | : October 4, 2022 |
| INVENTOR(S) | : Hößle et al. |

It is certified that error appears in the above-identified patent and that said Letters Patent is hereby corrected as shown below:

In the Specification

Column 4, Line 60:
After "which" insert -- are --

In the Claims

Column 7, Claim 4, Line 67:
"rotation" should be — rotational —

Column 8, Claim 6, Line 10:
After "as" insert -- claimed in --

Column 8, Claim 16, Line 63:
After "including at least" delete "of"

Column 9, Claim 16, Line 13:
After "motor;" insert -- and --

Column 10, Claim 18, Line 16:
After "45°;" insert -- and --

Column 10, Claim 18, Line 19:
After "speed," insert -- and --

Signed and Sealed this
Fourteenth Day of March, 2023

Katherine Kelly Vidal
*Director of the United States Patent and Trademark Office*

Page 1 of 1